(12) United States Patent
Sun et al.

(10) Patent No.: US 11,252,345 B2
(45) Date of Patent: Feb. 15, 2022

(54) DUAL-SPECTRUM CAMERA SYSTEM BASED ON A SINGLE SENSOR AND IMAGE PROCESSING METHOD

(71) Applicant: ZHEJIANG UNIVIEW TECHNOLOGIES CO., LTD., Binjiang District Hangzhou (CN)

(72) Inventors: Yue Sun, Binjiang District Hangzhou (CN); Duoming Chen, Binjiang District Hangzhou (CN); Hengle Yu, Binjiang District Hangzhou (CN)

(73) Assignee: ZHEJIANG UNIVIEW TECHNOLOGIES CO., LTD, Zhejiang (CN)

(*) Notice: Subject to any disclaimer, the term of this patent is extended or adjusted under 35 U.S.C. 154(b) by 0 days.

(21) Appl. No.: 16/965,832

(22) PCT Filed: Oct. 17, 2018

(86) PCT No.: PCT/CN2018/110685
§ 371 (c)(1),
(2) Date: Jul. 29, 2020

(87) PCT Pub. No.: WO2019/153787
PCT Pub. Date: Aug. 15, 2019

(65) Prior Publication Data
US 2021/0044763 A1 Feb. 11, 2021

(30) Foreign Application Priority Data
Feb. 11, 2018 (CN) .......................... 201810143997.4

(51) Int. Cl.
H04N 5/33 (2006.01)
H04N 5/369 (2011.01)
(Continued)

(52) U.S. Cl.
CPC ............ *H04N 5/332* (2013.01); *H04N 5/2253* (2013.01); *H04N 5/2351* (2013.01); *H04N 5/36965* (2018.08); *H04N 5/2352* (2013.01)

(58) Field of Classification Search
CPC ............. H04N 5/2253; H04N 5/23229; H04N 5/2351; H04N 5/2352; H04N 5/2353;
(Continued)

(56) References Cited

U.S. PATENT DOCUMENTS 7,809,426 B2* 10/2010 Kim ....................... A61B 5/055
600/420
7,809,429 B2 10/2010 Sato
(Continued)

FOREIGN PATENT DOCUMENTS

CN 1574383 2/2005
CN 103686111 3/2014
(Continued)

OTHER PUBLICATIONS

International Search Report dated Jan. 4, 2019 in International Patent Application No. PCT/CN2018/110685, pp. 1-5.
(Continued)

*Primary Examiner* — Peter D Le
(74) *Attorney, Agent, or Firm* — Byrne Poh LLP

(57) ABSTRACT

Provided are a dual-spectrum camera system based on a single sensor and an image processing method. The camera system includes a lens, an image sensor, and a logical light separation module and an image fusion module that are sequentially connected to the image sensor. The image sensor includes red-green-blue (RGB) photosensitive cells and infrared radiation (IR) photosensitive cells. An infrared cut-off filter layer is arranged on a light incoming path of the RGB photosensitive cells. The image sensor receives incident light entering through the lens to generate an original
(Continued)

image and sends the original image to the logical light separation module. The logical light separation module converts and separates the original image into a visible light image and an infrared image, and sends the visible light image and the infrared image to the image fusion module to generate a fused image.

19 Claims, 3 Drawing Sheets

(51) Int. Cl.
*H04N 5/225* (2006.01)
*H04N 5/235* (2006.01)

(58) Field of Classification Search
CPC ...... H04N 5/2354; H04N 5/238; H04N 5/243; H04N 5/332; H04N 5/36965; H04N 9/04515; H04N 9/04553
See application file for complete search history.

(56) References Cited

U.S. PATENT DOCUMENTS

| | | | |
|---|---|---|---|
| 10,116,925 B1* | 10/2018 | Wang | H04N 5/378 |
| 11,069,104 B1* | 7/2021 | Kuang | G06T 11/001 |
| 2004/0256561 A1 | 12/2004 | Beuhler et al. | |
| 2009/0040364 A1* | 2/2009 | Rubner | G06T 3/4053 348/362 |
| 2010/0165135 A1* | 7/2010 | Kalevo | H04N 5/2355 348/221.1 |
| 2010/0289885 A1* | 11/2010 | Lu | H04N 5/332 348/61 |
| 2011/0169984 A1* | 7/2011 | Noguchi | H04N 5/332 348/234 |
| 2011/0260059 A1* | 10/2011 | Jiang | H01L 27/14625 250/330 |
| 2011/0317048 A1* | 12/2011 | Bai | H04N 5/33 348/294 |
| 2012/0086095 A1* | 4/2012 | Nishiyama | H04N 21/25866 257/432 |
| 2012/0188389 A1* | 7/2012 | Lin | G06T 7/55 348/218.1 |
| 2013/0016900 A1* | 1/2013 | Kim | G06T 5/20 382/162 |
| 2014/0099005 A1* | 4/2014 | Mogi | G06K 9/00288 382/118 |
| 2014/0138519 A1* | 5/2014 | Wang | H01L 27/14649 250/206.1 |
| 2014/0153823 A1* | 6/2014 | Lee | G06T 3/4015 382/167 |
| 2015/0097680 A1* | 4/2015 | Fadell | F24F 11/30 340/628 |
| 2015/0156477 A1* | 6/2015 | Lee | H04N 13/207 348/46 |
| 2015/0200220 A1* | 7/2015 | Juenger | H01L 27/14627 257/432 |
| 2015/0256813 A1* | 9/2015 | Dal Mutto | G06T 7/593 348/47 |
| 2015/0287766 A1* | 10/2015 | Kim | H01L 27/14641 250/208.1 |
| 2015/0381963 A1* | 12/2015 | Dal Mutto | H04N 13/254 348/46 |
| 2016/0307325 A1* | 10/2016 | Wang | G03B 15/02 |
| 2016/0344965 A1 | 11/2016 | Grauer et al. | |
| 2017/0085806 A1* | 3/2017 | Richards | H04N 9/04 |
| 2017/0142312 A1* | 5/2017 | Dal Mutto | H04N 13/239 |
| 2017/0263662 A1* | 9/2017 | Hsieh | H01L 27/14621 |
| 2017/0374299 A1* | 12/2017 | Liu | G06T 5/50 |
| 2018/0295336 A1* | 10/2018 | Chen | G01B 11/25 |
| 2018/0309919 A1* | 10/2018 | Naing | H04N 9/045 |
| 2018/0322623 A1* | 11/2018 | Memo | G06N 3/084 |
| 2019/0124271 A1 | 4/2019 | Sato | |
| 2021/0067712 A1* | 3/2021 | Harter | A61B 5/0075 |
| 2021/0168307 A1* | 6/2021 | Ma | H04N 9/04553 |
| 2021/0185285 A1* | 6/2021 | Sun | H04N 9/04553 |
| 2021/0195117 A1* | 6/2021 | An | G06T 5/50 |

FOREIGN PATENT DOCUMENTS

| | | |
|---|---|---|
| CN | 102687502 | 7/2015 |
| CN | 104822033 | 8/2015 |
| CN | 105049829 | 11/2015 |
| CN | 105988215 | 10/2016 |
| CN | 106060364 | 10/2016 |
| CN | 106572289 | 4/2017 |
| CN | 104639923 | 8/2017 |
| CN | 107438170 | 12/2017 |
| CN | 104683767 | 3/2018 |
| WO | 2017159041 | 9/2017 |

OTHER PUBLICATIONS

Office Action dated Sep. 23, 2019 in CN Patent Application No. 201810143997.4, pp. 1-13.
Office Action dated May 21, 2020 in CN Patent Application No. 201810143997.4, pp. 1-7.
Search Report dated Sep. 11, 2019 in CN Patent Application No. 201810143997.4, pp. 1-2.
European Search Report dated Aug. 24, 2021 in EP Patent Application No. 18904907.5, pp. 1-10.

* cited by examiner

DUAL-SPECTRUM CAMERA SYSTEM BASED ON A SINGLE SENSOR AND IMAGE PROCESSING METHOD

CROSS-REFERENCE TO RELATED APPLICATIONS

The present application is a United States national stage application of co-pending International Patent Application Number PCT/CN2018/110685, filed on Oct. 17, 2018, which claims the priority of Chinese patent application No. 2018101439974, entitled "Dual-spectrum Camera System Based on a Single Sensor and Image Processing Method" and filed Feb. 11, 2018 with China National Intellectual Property Administration, the disclosures of which are hereby incorporated herein by reference in their entireties.

TECHNICAL FIELD

The present application relates to the technical field of image capturing and processing, and more particularly relates to a dual-spectrum camera system based on a single sensor and an image processing method.

BACKGROUND

A typical color camera only captures and uses information in the visible light waveband. In such scenes as low light, haze weather or the like, the color image effect will be severely degraded because of the decrease of the intensity of visible light or blockage of the scene information. In contrast, a clear, high signal-to-noise ratio infrared image can be obtained through appropriate exposure control in these scenes. On the other hand, however, the infrared image contains only grayscale information but no color information. A dual-spectrum camera is a kind of camera device that is capable of capturing and processing images at the visible light waveband and the infrared light waveband. A visible light image and an infrared image are simultaneously captured and fused through image fusion technology, which combines the advantages of the above two types of images.

A typical dual-spectrum camera generally adopts a dual-sensor design, in which two separate sets of lenses and sensor combinations are used to separately collect a visible light image and an infrared image. Then the two images are fused for further operations such as image processing, encoding, and transmission. For this solution, the hardware configuration of double lenses and double sensors has a relatively high cost, and the problem of stereo parallax between the two lenses cannot be avoided, giving rise to technical difficulties in terms of registration and fusion of the visible image and the infrared image. An improved version based on the dual-lens solution is a single-lens and dual-sensor solution, in which a light separation mechanism is added in the camera to separate the visible light and the infrared light from each other thus allowing the visible light and the infrared light to be separately imaged on two sensors. This solution can avoid the problem of stereo parallax, but the hardware configuration of the light separation system and the double sensors leads to an increase of the volume and cost of the camera.

In addition, for application scenes such as low light and haze penetration, a typical image fusion method usually performs a direct weighted synthesis of the luminance component of the visible light image with the infrared image, where a color fused image thus obtained makes it difficult to avoid problems in terms of luminance and color distortion caused by inconsistency of grayscale characteristics between the infrared image and the visible light image. To sum up, a typical dual-spectrum camera system still has problems including complex optical structure, large volume, high cost, color cast and luminance distortion caused by the inconsistency of grayscale characteristics between the infrared image and the visible image during the image fusion process.

SUMMARY

In view of this, an object of the present application is to provide a dual-spectrum camera system based on a single sensor and an image processing method, so as to simplify an optical structure of the dual-spectrum camera system, thereby facilitating miniaturization of a volume of a camera apparatus, reducing the cost, and improving the image effect.

In a first aspect, an embodiment of the present application provides a dual-spectrum camera system based on a single sensor. The dual-spectrum camera system includes a lens, an image sensor, and a logical light separation module and an image fusion module that are sequentially connected to the image sensor. The image sensor includes red-green-blue (RGB) photosensitive cells and infrared radiation (IR) photosensitive cells, where an infrared cut-off filter layer is disposed on a light incoming path of the RGB photosensitive cells. The image sensor is configured to receive incident light entering through the lens to generate an original image and send the original image to the logical light separation module. The logical light separation module is configured to convert and separate the original image into a visible light image and an infrared image, and send the visible light image and the infrared image to the image fusion module to generate a fused image.

In connection with the first aspect, an embodiment of the present application provides a first possible implementation of the first aspect, where the above-mentioned infrared cut-off filter layer is disposed on a surface of a microlens of each of the RGB photosensitive cells of the image sensor.

In connection with the first aspect, an embodiment of the present application provides a second possible implementation of the first aspect, where the above-mentioned infrared cut-off filter layer is disposed on a surface of a filter of each of the RGB photosensitive cells of the image sensor.

In connection with the first aspect, an embodiment of the present application provides a third possible implementation of the first aspect, where a two-dimensional pixel array of the image sensor includes a plurality of array cells, and each of the plurality of array cells includes the RGB photosensitive cells and the IR photosensitive cells.

The logical light separation module is configured to generate a unit visible light image component corresponding to each of the plurality of array cells based on data collected by the RGB photosensitive cells in this array cell, and generate the visible light image according to a plurality of unit visible light image components that are obtained.

The logical light separation module is further configured to generate infrared pixels corresponding to each of the plurality of array cells based on data collected by the IR photosensitive cells in this array cell, and generate the infrared image according to a plurality of infrared pixels that are obtained.

In connection with the first aspect, an embodiment of the present application provides a fourth possible implementation of the first aspect, where the logical light separation module is specifically configured to: sum or average color pixel values in each of a plurality of unit array cells in the original image to obtain color pixels, and combine the color pixels to obtain a unit visible light image component; sum or average IR pixels values in each of the plurality of array cells in the original image to obtain IR pixels, and combine the IR pixels to obtain a unit infrared image component; and combine the unit visible light image components to obtain the visible light image, and combine the unit infrared image components to obtain the infrared image.

In connection with the first aspect, an embodiment of the present application provides a fifth possible implementation of the first aspect, where a two-dimensional pixel array of the image sensor is periodically arranged in a 4×4 array cells; and each of the 4×4 array cells includes four types of pixel cells of R, G, B and IR, and a ratio of numbers pixels of R:G:B:IR is 2:4:2:8.

In connection with the first aspect, an embodiment of the present application provides a sixth possible implementation of the first aspect, where the image sensor is configured to control exposure parameters of the RGB photosensitive cells and the IR photosensitive cells separately according to a two-path auto exposure algorithm.

In connection with the first aspect, an embodiment of the present application provides a seventh possible implementation of the first aspect, where the dual-spectrum camera system further includes an image processing module. The image processing module is configured to calculate exposure parameters of the visible light image and the infrared image separately based on a two-path auto exposure algorithm, and configured to control the image sensor to update exposure parameters of the RGB photosensitive cells and the IR photosensitive cells separately to obtain a new original image.

In connection with the first aspect, an embodiment of the present application provides an eighth possible implementation of the first aspect, where the logical light separation module is further configured to obtain brightness information of the visible light image and the infrared image separately to generate statistical data of the visible light image and the infrared image, after decomposing the original image into the visible light image and the infrared image. The image processing module is specifically configured to calculate the exposure parameters of the visible light image and the infrared image separately based on the two-path auto exposure algorithm and the statistical data.

In a second aspect, an embodiment of the present application further provides an image processing method applied to a camera. The camera includes an image sensor, a logical light separation module and an image fusion module. The image sensor includes RGB photosensitive cells and IR photosensitive cells. The above-mentioned method includes the following operations: receiving, by the image sensor, incident light and generating an original image; sending the original image to the logical light separation module, and converting and separating, by the logical light separation module, the original image into a visible light image and an infrared image; and sending the visible light image and the infrared image to the image fusion module, and generating a fused image by the image fusion module.

In connection with the second aspect, an embodiment of the present application provides a first possible implementation of the second aspect, where the above-mentioned camera further includes an image processing module executing a two-path auto exposure algorithm; and a dual exposure circuit is disposed in the image sensor, which is configured to control exposure parameters of the RGB photosensitive cells and the IR photosensitive cells separately. The operation of receiving, by the image sensor, the incident light and generating the original image includes the following operations: receiving, by the logical light separation module, an original image of a previous frame transmitted by the image sensor, and decomposing the original image into the visible light image and the infrared image; calculating exposure parameters of the visible light image and the infrared image separately according to the two-path auto exposure algorithm; and controlling, by the image sensor, the RGB photosensitive cells and the IR photosensitive cells according to the exposure parameters to generate an original image of a current frame. In connection with the second aspect, an embodiment of the present application provides a second possible implementation of the second aspect, where the operation of calculating the exposure parameters of the visible light image and the infrared image separately according to the two-path auto exposure algorithm includes the following operations: obtaining brightness information of the visible light image and the infrared image separately to generate statistical data of the visible light image and the infrared image, and calculating the exposure parameters of the visible light image and the infrared image separately based on the statistical data and the two-path auto exposure algorithm.

In connection with the second aspect, an embodiment of the present application provides a third possible implementation of the second aspect, where the operation of converting and separating, by the logical light separation module, the original image into the visible light image and the infrared image includes the following operations: summing or averaging color pixel values in each of a plurality of unit array cells in the original image to obtain color pixels, and combining the color pixels to obtain a unit visible light image component; summing or averaging IR pixel values in each of the plurality of unit array cells in the original image to obtain IR pixels, and combining the IR pixels to obtain a unit infrared image component; and combining the unit visible light image components to obtain the visible light image, and combining the unit infrared image components to obtain the infrared image.

In connection with the second aspect, an embodiment of the present application provides a fourth possible implementation of the second aspect, where the operation of generating the fused image by the image fusion module includes the following operations: estimating an ambient illuminance relative value based on the visible light image and outputting a first weighting coefficient ω1; estimating an ambient haze relative value based on the visible light image and outputting a second weighting coefficient ω2; performing color gamut conversion on the visible light image to obtain a luminance component and a chrominance component of the visible light image; obtaining a visible light brightness image based on the luminance component of the visible light image, and performing image stratification on the visible light brightness image and the infrared image to obtain a low frequency layer of the visible light brightness image, a detail layer of the visible light brightness image, and a detail layer of the infrared image; fusing the visible light luminance component and the infrared image to obtain a luminance component of the fused image based on the first weighting coefficient, the second weighting coefficient, the low frequency layer of the visible light brightness image, the detail layer of the visible light brightness image, and the detail layer of the infrared image; and obtaining the fused image through the color gamut conversion based on the luminance component of the fused image and the chrominance component of the visible light image.

In connection with the third possible implementation of the second aspect, an embodiment of the present application provides a fifth possible implementation of the second aspect, where the operation of performing the color gamut conversion on the visible light image to obtain the luminance component and the chrominance component of the visible light image includes the following operations: converting the visible light image from a Bayer domain into an RGB domain; and converting the visible light image from the RGB domain into a color space in which luminance and chrominance are separated to obtain the luminance component and the chrominance component of the visible light image.

Embodiments of the present application may include the following beneficial effects.

In the dual-spectrum camera system based on the single sensor and the image processing method provided in the embodiments of the present application, the dual-spectrum camera system based on the single sensor includes the lens, the image sensor, and the logical light separation module and the image fusion module that are sequentially connected to the image sensor. The image sensor includes the RGB photosensitive cells and the IR photosensitive cells, where the infrared cut-off filter layer is disposed on the light incoming path of the RGB photosensitive cells; the image sensor receives the incident light entering through the lens to generate the original image and sends the original image to the logical light separation module; and the logical light separation module converts and separates the original image into the visible light image and the infrared image, and sends the visible light image and the infrared image to the image fusion module to generate the fused image. Thus, the optical structure of the dual-spectrum camera system is made simpler, facilitating the miniaturization of the camera apparatus and reducing the cost.

Other features and advantages of the present disclosure will become apparent by the description set forth below, or part of the features and advantages may be inferred or determined from the specification without ambiguity, or may be obtained by implementing the above-mentioned solutions of the present disclosure.

For a better understanding of the above-mentioned objects, features and advantages of the present disclosure, illustrative embodiments will be described in detail below in connection with the accompanying drawings.

BRIEF DESCRIPTION OF DRAWINGS

For a better understanding of specific embodiments of the present application or the technical solution in the related art, the drawings that need to be used in the specific embodiments or in the description of the related art will now be briefly described. Apparently, the drawings described below are some embodiments of the present application, and for those skilled in the art, other drawings may be obtained according to the drawings without creative efforts.

In the drawings.

Figure 1:
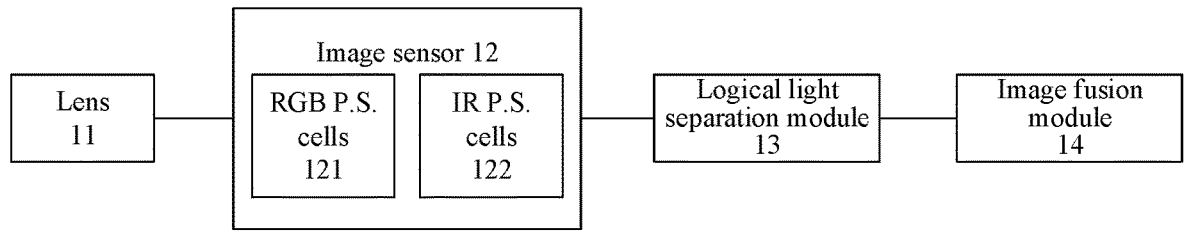
FIG. 1 is a block diagram of a dual-spectrum camera system based on a single sensor according to an embodiment of the present application.

11: Lens; 12: Image sensor; 13: Logical light separation module; 14: Image fusion module; 121: RGB photosensitive cells; 122: IR photosensitive cells; 21: Microlens; 22: Filter; 23: Photodiode; 24: Silicon substrate material; 25: Infrared cut-off filter layer; 51: Image processing module; 52: Image encoding and network module; 71: Aperture; and 72: Infrared light-compensating lamp.

DETAILED DESCRIPTION

Objects, technical solutions and advantages of embodiments of the present application will be clearer from a clear and complete description of technical solutions of the present application in connection with the drawings. Apparently, the described embodiments are part, not all, of the embodiments of the present application. Based on the embodiments of the present application, all other embodiments obtained by those skilled in the art without creative work are within the scope of the present application.

Currently, for existing typical single-lens and dual-sensor dual-spectrum camera, ambient light is decomposed into visible light and infrared light by a light separation system after entering the camera, then a visible light image and an infrared image are obtained after the visible light and the infrared light are imaged on two separate sensors separately, a visible light image and the infrared image are fused by an image fusion module, and then typical image processing, compression coding, data transmission and other operations are performed on the fused image. An optical structure of this kind of camera is relatively complex, and a light separation mechanism needs to be added, which is not conducive to miniaturization design and cost control of a camera apparatus. In addition, a typical image fusion method usually directly weights and synthesizes a luminance component of the visible light image with the infrared image, and a color fusion image obtained from the typical image fusion method makes it difficult to avoid problems in terms of luminance and color distortion caused by inconsistency of grayscale characteristics between the infrared image and the visible light image.

Based on this, a dual-spectrum camera system based on a single sensor and an image processing method are provided in embodiments of the present application. Firstly, a dual-spectrum camera system design based on the single sensor is proposed for a problem that a dual-spectrum camera system has a complex structure and a large volume, which has a simple optical structure and facilitates miniaturization design of camera apparatus. Secondly, an improved RGB-IR sensor solution is proposed to achieve independent control of exposure of the visible light image and the infrared image, and has better signal-to-noise ratio and color performance. In addition, an effective image fusion algorithm is further provided, which optimizes the problem of color cast and luminance distortion caused by the inconsistency of grayscale characteristics of the infrared image and the visible image, and improves the image effect of bad scenes such as low illumination and haze days.

In order to facilitate understanding of this embodiment, firstly, a dual-spectrum camera system based on a single sensor disclosed in the embodiments of the present application is described in detail.

Embodiment One

FIG. 1 is a block diagram of a dual-spectrum camera system based on a single sensor according to an embodiment of the present application. As illustrated in FIG. 1, the dual-spectrum camera system includes a lens 11, an image sensor 12 and a logical light separation module 13 and an image fusion module 14 that are sequentially connected to the image sensor 12. The image sensor 12 may include red-green-blue (RGB) photosensitive cells 121 and infrared radiation (IR) photosensitive cells 122, where an infrared cut-off filter layer is disposed on a light incoming path of the RGB photosensitive cells 121.

The image sensor 12 receives incident light entering through the lens 11 to generate an original image and sends the original image to the above-mentioned logical light separation module 13. The logical light separation module 13 converts and separates the original image into a visible light image and an infrared image, and sends the visible light image and the infrared image to the image fusion module 14 to generate a fused image.

The original image in this embodiment may refer to a data set composed of data collected by each of the photosensitive cells of the image sensor 12, data collected by the RGB photosensitive cells and data collected by the IR photosensitive cells have not been distinguished in the data set, and the image sensor 12 may send the above-mentioned data set to a logical light separation unit in a mode of data stream transmission.

The logical light separation module 13 may be pre-configured with or recorded with a type of each photosensitive cells (for example, a photosensitive cells is an RGB photosensitive cells or an IR photosensitive cells) and a corresponding relationship between each photosensitive cells and a position of an image pixel. After obtaining data collected by each photosensitive cell, the logical light separation module 13 converts the data collected by the RGB photosensitive cells into the visible light image and converts the data collected by the IR photosensitive cells into the infrared image according to the type of each photosensitive cells and a pixel position corresponding to each photosensitive cells.

Based on the above-mentioned design, in this embodiment, light incident to the RGB photosensitive cells and light incident to the IR photosensitive cells is light refracted by the same lens 11. Therefore, there is no stereo parallax between formed visible light image and infrared image, resulting in a high matching degree between the visible light image and the infrared image, thereby reducing difficulty in subsequent fusion of the visible light image and the infrared image.

The above-mentioned image sensor 12 is an improved RGB-IR sensor herein, which can simultaneously collect the visible light image and the infrared image, exposure parameters of the visible light image and the infrared image can be independently controlled, and a generated visible light image has advantages of high signal-to-noise ratio, good color performance, and the like. The image sensor 12 can ensure that both the visible light image and the infrared image can obtain a best exposure and image effect in various complex scenes in combination with a two-path exposure control mode.

Figure 2:
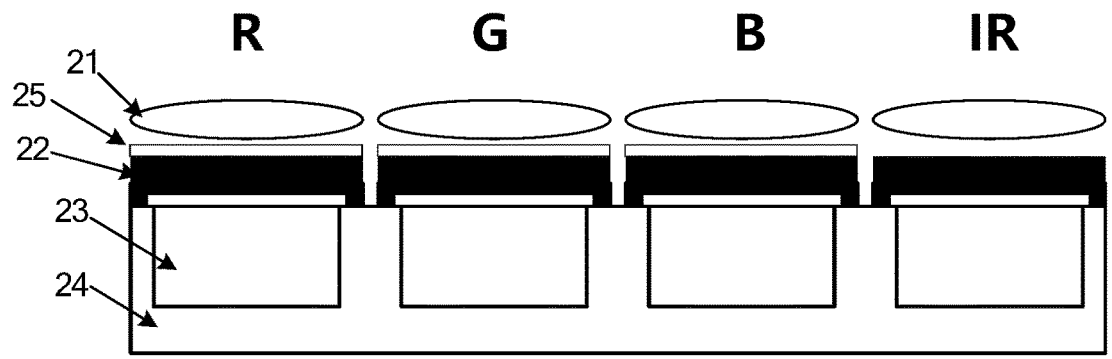
FIG. 2 is a schematic diagram illustrating RGB-IR photosensitive cells according to an embodiment of the present application.

Compared with a typical RGB-IR sensor design, the image sensor 12 provided by the embodiment of the present application has a key improvement in which an infrared cut-off filter layer is added on a light incoming path of each of the RGB photosensitive cells 121, which ensures that pixel units of R, G and B only sense visible light information, avoiding color cast of an image. Herein, a spectral characteristic of the infrared cut-off filter layer is allowing transmission of visible light component (a wavelength is 390-780 nm) and cutting off infrared light component (a wavelength is greater than 800 nm). In one or more possible implementations, the infrared cut-off filter layer is disposed on a surface of a microlens of each of the RGB photosensitive cells 121 of the image sensor 12 or a surface of a filter of each of the RGB photosensitive cells 121 of the image sensor 12. FIG. 2 is a schematic diagram illustrating RGB-IR photosensitive cells 122 according to an embodiment of the present application. As illustrated in FIG. 2, the RGB-IR photosensitive cells 122 includes the microlens 21, the filter 22, a photodiode 23, silicon substrate material 24 and the infrared cut-off filter layer 25. The microlens 21 is configured to concentrate light to improve photosensitive performance of an element. The filter 22 may be an optical element that selects a required photosensitive waveband, different photosensitive cells adopt different filters 22, and a specific filter can allow or prevent light of a specific wavelength from passing through. The photodiode 23 is configured to convert an acquired optical signal into an electrical signal for subsequent transmission processing. In the implementation illustrated in FIG. 2, the infrared cut-off filter layer 25 is disposed on the surface of the filter 22 of each of the RGB photosensitive cells 121 of the image sensor 12.

It is to be noted that the above-mentioned infrared cut-off filter layer 25 is added only to the RGB photosensitive cells 121, and is unable to be added to the IR photosensitive cells 122. For the RGB-IR photosensitive cells shown in FIG. 2, a spectral response characteristic is that an RGB cell only senses visible light waveband information and an IR unit mainly senses near infrared waveband information with a wavelength range from 800 nm to 1000 nm. In the image sensor 12 provided by the embodiment of the present application, on one hand, it is ensured that the color image imaged by the RGB photosensitive cells 121 contains only visible light information without color cast; and on the other hand, the infrared image and the color image imaged by the IR photosensitive cells 122 may have mutually independent exposure parameters, thus theoretically ensuring that both the color image and the infrared image achieve the best exposure and image effect.

Figure 3:
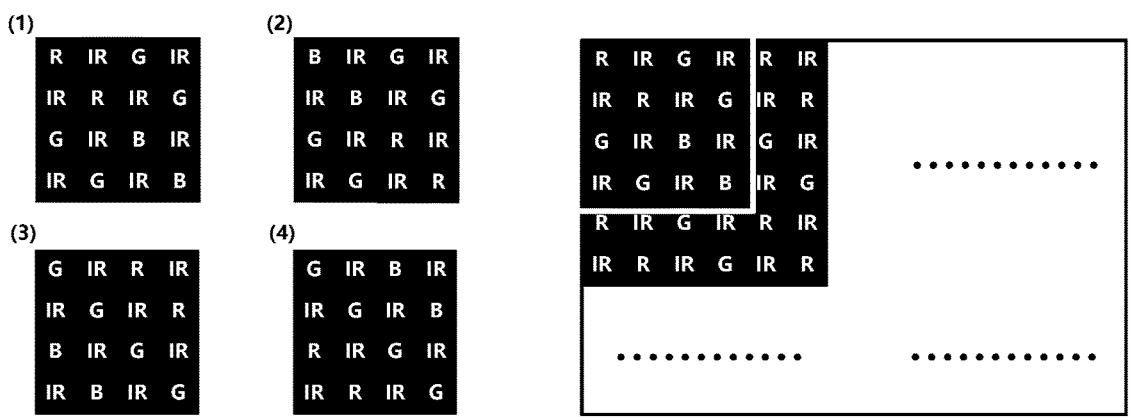
FIG. 3 is a schematic diagram illustrating the arrangement of photosensitive cells of an RGB-IR image sensor according to an embodiment of the present application.

The image sensor 12 in the embodiment of the present application may include a plurality of array cells, and each of the plurality of array cells includes the RGB photosensitive cells and the IR photosensitive cells. For example, a two-dimensional pixel array of the image sensor 12 is formed by periodically arranging 4×4 array cells, and each 4×4 array cell includes four pixel cells (that is, a photosensitive cells) of R, G, B and IR, and a ratio of numbers of the four pixels R:G:B:IR is 2:4:2:8. Each 4×4 array cell may further be divided into four 2×2 array cells, and each 2×2 array cell is composed of a pair of IR cells and a pair of color cells (any one of cells of R, G, B), which may be divided into three combinations in total, namely an IR+R combination, an IR+G combination and an IR+B combination. Two IR cells in the 2×2 array cells are distributed diagonally, and two color cells are also distributed diagonally. Four 2×2 array cells included in each 4×4 array cell are one IR+R combination cell, one IR+B combination cell and two IR+G combination cells respectively, and the IR+R combination cell and the IR+B combination cell are distributed diagonally, and the two IR+G combination cells are also distributed diagonally. FIG. 3 is a schematic diagram illustrating the arrangement of photosensitive cells of an RGB-IR image sensor 12 according to an embodiment of the present application. As illustrated in FIG. 3, (1) to (4) in FIG. 3 separately show a pixel arrangement in the above-mentioned four 4×4 array cells, and a right side of FIG. 3 shows a schematic diagram of an array of the image sensor 12 composed of 4×4 array cells arranged according to a mode shown in (1).

The image sensor 12 outputs image data in an RGB-IR format to the logical light separation module 13, and the logical light separation module 13 converts the image data in the RGB-IR format into separate visible image and infrared image. For example, in this embodiment, each array cell may correspond to one unit visible light image component and one unit infrared image component, where the one unit visible light image component may be one pixel on the visible light image and one unit infrared image component may be one pixel on the infrared image. For each array cell, the logical light separation module 13 generates the unit visible light image component corresponding to each array cell based on the data collected by the RGB photosensitive cells in each array cell, and generates the visible light image according to acquired a plurality of visible light pixels. For each array cell, the logical light separation module 13 generates the unit infrared image component corresponding to each array cell based on the data collected by the IR photosensitive cells in each array cell, and generates the infrared image according to a plurality of unit infrared image components that are obtained.

The visible light image is in Bayer format, and the infrared image is a grey-scale map. An image separation process is implemented by digital image processing on logic elements (field programmable gate array (FPGA), application specific integrated circuit (ASIC), digital signal processor (DSP) and the like), which is different from traditional light separation, so it is called logical light separation.

Figure 4:
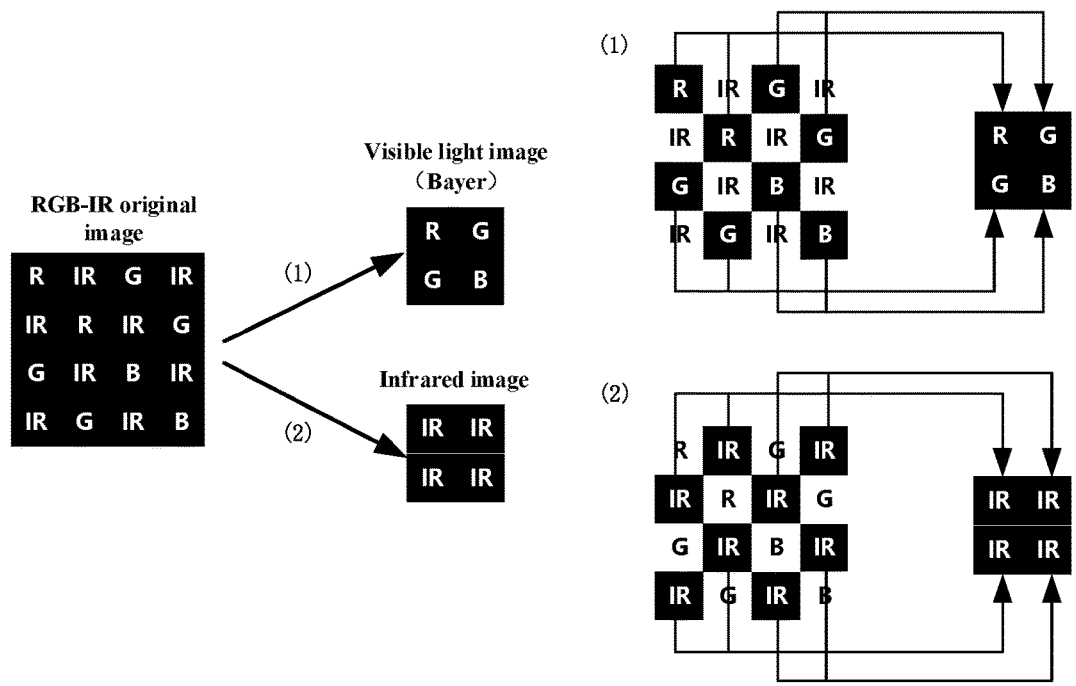
FIG. 4 is a schematic diagram illustrating the implementation of logical light separation module according to an embodiment of the present application.

FIG. 4 is a schematic diagram illustrating the implementation of logical light separation according to an embodiment of the present application. In the implementation illustrated in FIG. 4, one 4×4 array cell of the original image in the RGB-IR format is described as an example. The array cell is divided into four 2×2 array cells, which are one IR+R combination cell, one IR+B combination cell and two IR+G combination cells separately. Firstly, color pixel values in the four 2×2 array cells are added or averaged separately to obtain four color pixels including one R, one B and two G, which are combined into a visible light image Bayer cell with a size of 2×2, as illustrated in (1) in FIG. 4. Secondly, IR pixel values in the four 2×2 array cells are added or averaged separately to obtain four IR pixels, which are combined into an infrared image component with a size of 2×2, as shown in (2) in FIG. 4. Finally, all 4×4 array cells of the RGB-IR image are traversed and the above-mentioned operation is repeated, and finally one visible light image in the Bayer format and one infrared image may be obtained, both of the one visible light image and the one infrared image have a resolution of ¼ of a resolution of the original RGB-IR image, and both width and height of the one visible light image and the one infrared image are half of width and height of the original RGB-IR image. Compared with the original RGB-IR image, the visible light image and the infrared image have an improvement in pixel sensitivity (signal-to-noise ratio), because each pixel value of the visible light image and the infrared image is a sum (or average) of two corresponding pixel values of the original RGB-IR image. However, theoretical calculation shows that in a white noise model, a signal-to-noise ratio of a sum (or average) of n pixel values with a same signal-to-noise ratio is $\sqrt{n}$ times of a signal-to-noise ratio of an original pixel, which indicates that the above-mentioned resolution reduction processing is helpful to improve the image effect in scenes such as low illumination and haze weathers.

Bayer domain information of the visible light image obtained by the logical light separation module 13 after the above-mentioned resolution reduction processing is complete, similar to that of a typical color sensor. However, a typical non-reduced resolution RGB-IR sensor inevitably has a problem of color information loss caused by a replacement of some color pixels by IR pixels, which leads to color distortion, color aliasing and other problems. Therefore, in the dual-spectrum camera system provided by the embodiment of the present application, color performance of the visible light image output by the image sensor 12 and the logical light separation module 13 should be superior to color performance of the visible light image of the typical RGB-IR sensor.

In addition, the above-mentioned image sensor 12 may further be configured to control exposure parameters of the RGB photosensitive cells 121 and the IR photosensitive cells 122 separately according to a two-path auto exposure algorithm. Furthermore, the image fusion module 14 fuses the visible light image and the infrared image output by the logical light separation module 13 to output a fused image, where the fused image is in the Bayer format. Compared with the visible light image before fusion, the fused image can achieve better signal-to-noise ratio, clarity, color performance, and the like in scenes such as low illumination and haze weathers. The image fusion module 14 is implemented on a logic element (FPGA, ASIC, DSP, and the like) in the camera. In addition, in the embodiment of the present application, requirements for the lens 11 are described below. First, the lens 11 has a good light intensity passing rate from the visible light waveband (390 nm to 780 nm) to the near infrared waveband (800 nm to 1000 nm). Second, the lens 11 is a confocal lens of the visible light and the infrared light, ensuring that imaging of the visible light and the infrared light at the image sensor 12 can reach clarity simultaneously.

Figure 5:
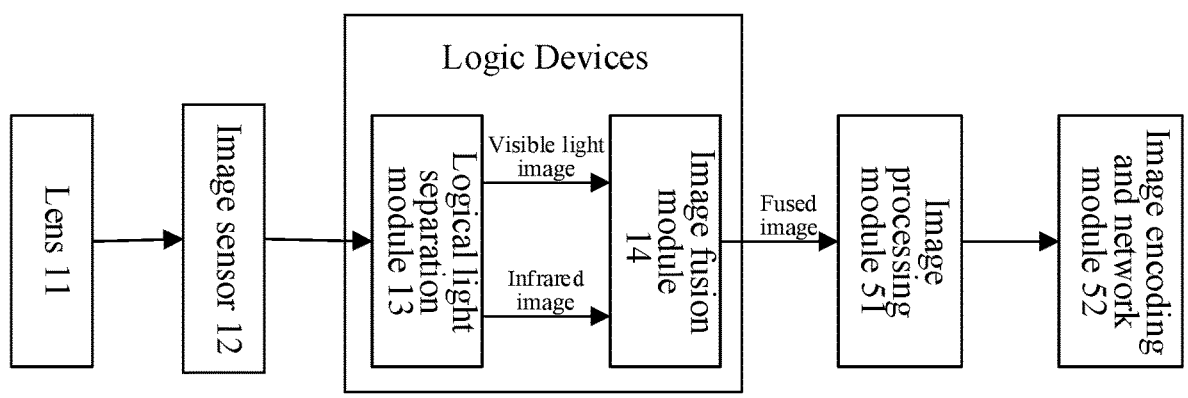
FIG. 5 is a block diagram of another dual-spectrum camera system based on a single sensor according to an embodiment of the present application.

In practical application, FIG. 5 is a block diagram of another dual-spectrum camera system based on a single sensor according to an embodiment of the present application. As illustrated in FIG. 5, the camera system includes the lens 11, the image sensor 12, the logical light separation module 13, the image fusion module 14, an image processing module 51 and an image encoding and network module 52.

The image processing module 51 is configured to receive the fused image from the image fusion module 14 and perform typical image signal processing (for example, white balance, color correction, noise reduction, contrast control, and the like) on the fused image to enhance the image effect; and calculate an auto-exposure algorithm, an auto-focus algorithm and other algorithms, control the sensor and the lens 11 such that collected visible light and infrared image achieve best picture brightness and clarity, that is, calculation of the two-path auto exposure algorithm on which the image sensor 12 depends to adjust the exposure parameters can be calculated by the image processing module 51, and the calculated result is sent to the image sensor 12.

Optionally, a dual exposure circuit is disposed in the image sensor 12, which can adjust exposure parameters of the RGB photosensitive cells and the IR photosensitive cells separately. The image processing module 51 may be configured to calculate the exposure parameters of the visible light image and the infrared image separately based on the two-path auto exposure algorithm, and configured to control the image sensor 12 to update the exposure parameters of the RGB photosensitive cells 121 and the IR photosensitive cells 122 separately to obtain a new original image.

Specifically, in this embodiment, the logical light separation module 13 is further configured to decompose the original image into the visible light image and the infrared image, and count brightness information of the visible light image and the infrared image separately to generate statistical data of the visible light image and the infrared image. The image processing module 51 calculate the exposure parameters of the visible light image and the infrared image separately based on the two-path auto exposure algorithm according to the statistical data.

The image encoding and network module 52 is configured to encode and compress an image output by the image processing module 51, and save image data to an external apparatus by network transmission.

In the dual-spectrum camera system based on the single sensor provided in the embodiment of the present application, the infrared cut-off filter layer is disposed on the light incoming path of the RGB photosensitive cells, and independent control of exposure of the visible light and the infrared is achieved in combination with the two-path exposure control mode. In addition, the collected image has advantages of high signal-to-noise ratio, good color performance and the like compared with the typical non-reduced resolution RGB-IR sensor through optimization of arrangement of pixel array and a logical light separation design with reduced resolution.

Embodiment Two

Figure 6:
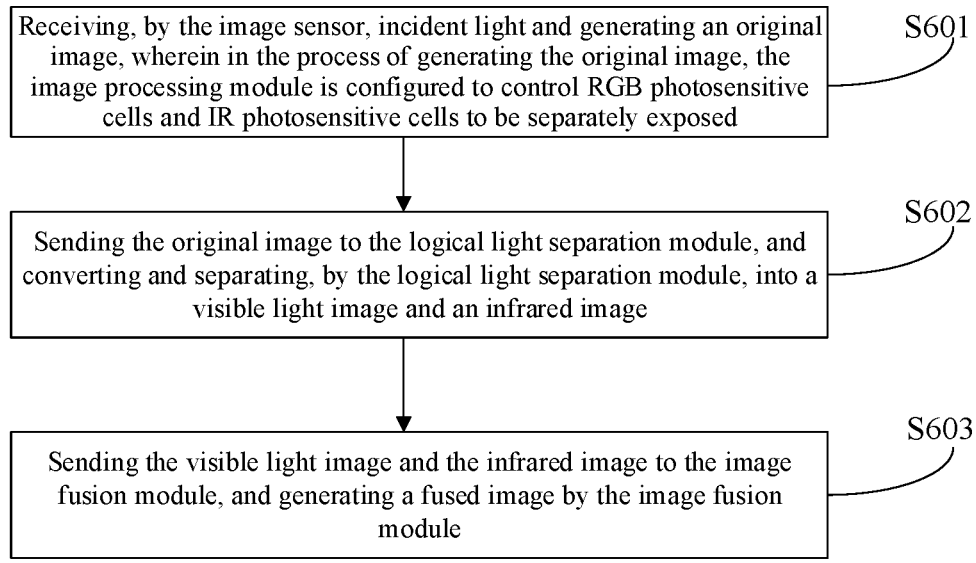
FIG. 6 is a flowchart illustrating an image processing method according to an embodiment of the present application.

Embodiment two of the present application further provides an image processing method applied to a camera, where the camera may be the camera provided in the embodiment one of the present application, and the camera includes an image sensor 12, a logical light separation module 13, an image fusion module 14 and an image processing module 51, where the image sensor 12 includes RGB photosensitive cells 121 and IR photosensitive cells 122. FIG. 6 is a flowchart illustrating an image processing method according to an embodiment of the present application. As illustrating in FIG. 6, the image processing method includes the following operations.

Step S601: the image sensor receives incident light and generates an original image; and in a process of generating the original image, the above-mentioned image processing module is configured to control the RGB photosensitive cells and the IR photosensitive cells to be exposed separately.

A two-path auto exposure algorithm is executed in the image processing module 51, and a dual exposure circuit is disposed in the image sensor 12, which is configured to control exposure parameters of the RGB photosensitive cells 121 and the IR photosensitive cells 122 separately. The logical light separation module 13 receives an original image of a previous frame sent by the image sensor 12, and decomposes the original image of the previous frame into the visible light image and the infrared image. Exposure parameters of the visible light image and the infrared image are calculated separately according to the two-path auto exposure algorithm. The image sensor 12 controls the RGB photosensitive cells and the IR photosensitive cells according to the exposure parameters to generate an original image of a current frame.

Implementation of control of two-path exposure will be described in more detail herein. In order to ensure a best exposure effect of the visible light image and the infrared image simultaneously, on one hand, it is necessary to execute the two-path auto exposure (AE) algorithm on the image processing module 51 (an image sensor processor (ISP) chip), and on the other hand, it is necessary to implement a two-path exposure circuit in the image sensor 12 to separately control the exposure times and gains of the RGB photosensitive cells 121 and the IR photosensitive cells 122.

Figure 7:
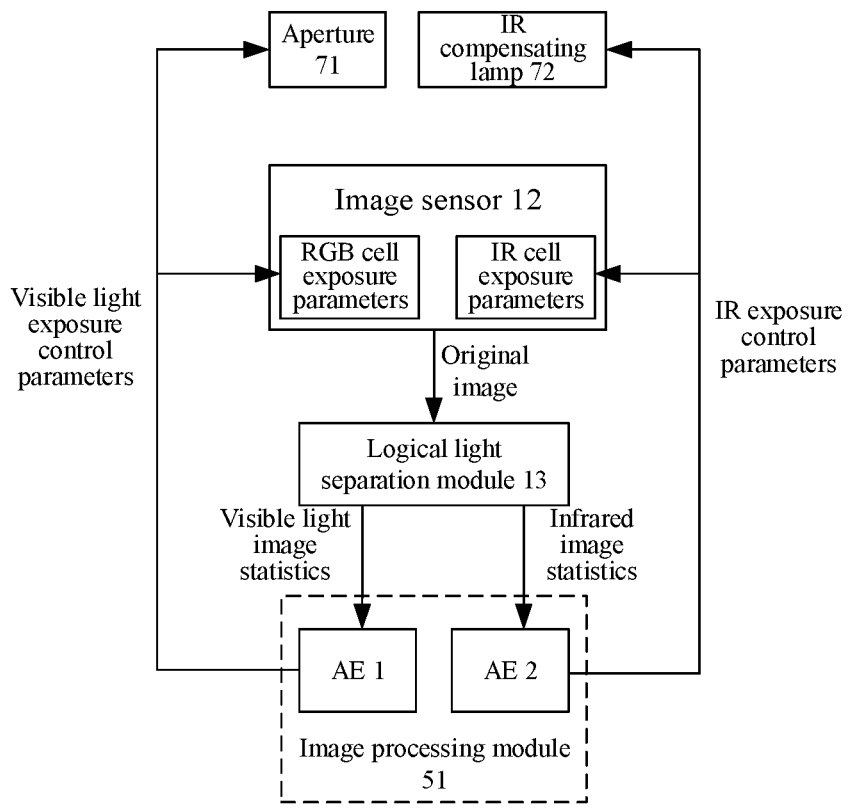
FIG. 7 is a flowchart illustrating two-path exposure control according to an embodiment of the present application.

FIG. 7 is a flowchart illustrating the two-path exposure control according to an embodiment of the present application. In the implementation illustrated in FIG. 7, the two-path exposure control includes hardware parts including the image sensor 12, the logical light separation module 13, the image processing module 51, an aperture 71, and an infrared light-compensating lamp 72. Firstly, the logical light separation module 13 decomposes the original image into the visible light image and the infrared image, and counts brightness information (for example, global brightness information and local brightness information may be included) of the visible light image and the infrared image separately to generate statistical data of the visible light image and the infrared image. Secondly, the two-path auto exposure (AE) algorithm is executed on the image processing module 51, where one AE algorithm receives statistical data of the visible light image and calculates to obtain exposure parameters of visible light image, where the exposure parameters include an aperture value, a shutter size, a gain value, and the like. The other AE algorithm receives statistical data of the infrared image and calculates exposure parameters of the infrared image, where the exposure parameters include the shutter size, the gain value, infrared lamp light-compensating light intensity, and the like. Then, the exposure parameters of visible light and the infrared image are separately transmitted, where a shutter and a sensor gain value of the visible light image are transmitted to the a register corresponding to the RGB photosensitive cells 121 of the image sensor 12 to take effect, while a shutter and a sensor gain value of the infrared image are transmitted to a register corresponding to the IR photosensitive cells 122 of the image sensor 12 to take effect. In addition, an aperture value calculated by visible image AE and an intensity value of infrared light-compensating lamp 72 calculated by infrared image AE are separately transmitted to corresponding controllers of the aperture 71 and the infrared light-compensating lamp 72 to take effect. Through the two-path exposure control mode, the visible light image and the infrared image can simultaneously achieve the best exposure effect.

In at least one implementation, the image processing module 51 may further implement exposure by using a typical single exposure control algorithm, obtain a single set of exposure parameters by calculating one way AE algorithm, and then control exposure of all photosensitive cells (including RGB cells and IR cells) in the image sensor. Firstly, the image fusion module fuses the visible light image with the infrared image to obtain a fused image, obtains global brightness information and local brightness information of the fused image to generate statistical information, and provides the AE algorithm with the statistical information. Secondly, the AE algorithm calculates to obtain an exposure control parameter, transmits a shutter and sensor gain to the image sensor to take effect, and transmits an aperture value and an infrared light-compensating lamp intensity value to a corresponding aperture and infrared light-compensating lamp controller separately to take effect.

Step S602: the original image is transmitted to the logical light separation module, and the original image is converted and separated into the visible light image and the infrared image by the logical light separation module.

After the original image is generated, the camera transmits the original image to the logical light separation module 13, and then the logical light separation module 13 adds or averages a color pixel value in each unit array cell in the original image to obtain color pixels, and combine the color pixels to obtain a unit visible light image component. In addition, an IR pixel value in each unit array cell in the original image is added or averaged to obtain IR pixels, and then combine the IR pixels to obtain a unit infrared image component. Finally, the visible light image is obtained by combination of the unit visible light image components, and the infrared image is obtained by combination of the unit infrared image components.

Step S603: the visible light image and the infrared image are transmitted to the image fusion module, and a fused image is generated by the image fusion module.

In a process of generating the fused image by the image fusion module 14, firstly, an ambient illuminance relative value is estimated based on the visible light image and a first weighting coefficient ω1 is output. The details are described below. Picture brightness $L_{vis}$, shutter time $T_{shutter}$, sensor gain Gain of the visible light image are acquired, the ambient illuminance relative value $L_{env}$ is calculated, where $L_{env}=L_{vis}/(T_{shutter} \times Gain)$, and a first synthesis coefficient $\omega_1$ is calculated according to the calculated ambient illuminance relative value $L_{env}$ and preset ambient illuminance thresholds $L_{T1}$ and $L_{T2}$. A calculation formula is described below.

$$\omega_1 = \begin{cases} 1, & L_{env} <= L_{T1} \\ (L_{T2}-L_{env})/(L_{T2}-L_{T1}), & L_{T1} < L_{env} < L_{T2} \\ 0, & L_{env} >= L_{T2} \end{cases} \quad (1)$$

Two thresholds satisfy $L_{T1}<L_{T2}$, the first weighting coefficient on is between 0 and 1, and within a threshold range $[L_{T1}, L_{T2}]$, the lower the illuminance, the greater the $\omega_1$.

An ambient haze relative value is estimated based on the visible light image and a second weighting coefficient $\omega_2$ is output. The details are described below. Firstly, a dark channel image of the visible light image is calculated and obtained, and an average value of the dark channel image is calculated to obtain the ambient haze relative value $S_{fog}$. Secondly, a second synthesis coefficient $\omega_2$ is calculated according to the ambient haze relative value $S_{fog}$ and preset haze thresholds $S_{T1}$ and $S_{T2}$, and a calculation formula is as follows.

$$\omega_2 = \begin{cases} 0, & S_{fog} <= S_{T1} \\ (S_{fog}-S_{T1})/(S_{T2}-S_{T1}), & S_{T1} < S_{fog} < S_{T2} \\ 1, & S_{fog} >= S_{T2} \end{cases} \quad (2)$$

Two thresholds satisfy $S_{T1}<S_{T2}$, the second weighting coefficient $\omega_2$ is between 0 and 1, and within a threshold range $[S_{T1}, S_{T2}]$, the larger the haze, the greater the $\omega_2$.

Then color gamut conversion is performed on the visible light image to obtain a luminance component and a chrominance component of the visible light image. Here, the visible light image needs to be converted from a Bayer domain to an RGB domain, and then the visible light image is converted from the RGB domain to a color space (for example, HSV, YIQ, YUV, Lab, and the like) in which luminance and chrominance are separated, so as to obtain the luminance component and chrominance component of the visible light image.

Then a visible light brightness image is obtained from the luminance component of the visible light image, and image stratification is performed on the visible light brightness image and the infrared image to obtain a low frequency layer of the visible light brightness image, a detail layer of the visible light brightness image and a detail layer of the infrared image.

A visible light luminance component and the infrared image are fused to obtain a luminance component of the fused image by utilizing the above-mentioned first weighting coefficient, the second weighting coefficient, the low frequency layer of the visible light brightness image, the detail layer of the visible light brightness image and the detail layer of the infrared image.

A calculation formula of the luminance component of the fused image is as follows.

$$c=\max(\omega_1,\omega_2),$$

$$D_{comb}=c \cdot D_{IR}+(1-c) \cdot D_{visY},$$

$$Y_{comb}=B_{visY}+D_{comb}. \quad (3)$$

In the above formula, $B_{visY}$ and $D_{visY}$ are the low frequency layer and the detail layer of luminance component of the visible light image separately, $D_{IR}$ is the detail layer of the infrared image, $Y_{comb}$ is the luminance component of the fused image, and synthesis coefficients $\omega_1$ and $\omega_2$ are calculated from formula (1) and formula (2) separately. Through stratification and detail layer synthesis of the above-mentioned image, a problem of brightness and color distortion of the synthesized image caused by inconsistent grayscale characteristics of the infrared image and the visible light image may be avoided as much as possible, improving an effect of the fused image.

Finally, the fused image is obtained through the color gamut conversion by using the luminance component of the fused image and the chrominance component of the visible light image.

The above-mentioned image fusion algorithm may also be compatible with improvement of the picture effect of scenes such as low illumination and haze days. When ambient illumination is too low or the ambient haze is too high, contribution of infrared components in the fused image can be adaptively increased to improve the signal-to-noise ratio. For the problem of inconsistency of grayscale characteristics between the infrared image and the visible light image, the problems of local brightness and color distortion of the fused image may be avoided through image stratification and detail layer synthesis, obtaining a more delicate and real fused image.

To sum up, the dual-spectrum camera system based on the single sensor and the image processing method provided in the embodiment of the present application can simplify an optical structure of the dual-spectrum camera system, thereby facilitating miniaturization of the camera apparatus, reducing the cost, and improving the image effect.

Unless stated otherwise, elements, relative steps in steps, numerical expressions, and numerical values set forth in the embodiments do not limit the scope of the present application.

In all examples illustrated and described herein, any particular value should be interpreted as exemplary only, and not by way of limitation, and therefore, other examples of exemplary embodiments may have different values. The above-mentioned embodiment one and embodiment two are also not a relatively independent embodiment, and technical features in the above-mentioned embodiment one and embodiment two may also be fused to each other.

The flowcharts and block diagrams in the drawings illustrate possible implementation of architectures, functions and operations of the systems, methods and computer program products according to multiple embodiments of the present application. In this regard, each block in a flowchart or block diagram may represent a module, a program segment, or part of codes that contains one or more executable instructions for implementing specified logical functions. It is to be noted that, in some alternative implementations, functions noted in the block may take an order different than noted in the drawings. For example, two sequential blocks may, in fact, be executed substantially concurrently, or sometimes executed in a reverse order, which depends on involved functions. It is to be noted that each block of the block diagrams and/or flowcharts, and combinations of blocks in the block diagrams and/or flowcharts may be implemented by specific-purpose hardware-based systems that perform specified functions or actions, or combinations of specific-purpose hardware and computer instructions.

In addition, in the description of the embodiments of the present application, unless otherwise expressly specified and defined, terms like "mounted", "connected to each other", "connected" are to be understood in a broad sense, for example, as fixedly connected, detachably connected or integrally connected; mechanically connected or electrically connected; directly connected or indirectly connected via an intermediate medium; or internally connected between two elements. For those skilled in the art, the above-mentioned term in the present application may be understood depending on specific contexts.

In the description of the present application, it is to be noted that the orientational or positional relationships indicated by terms "center", "above", "below", "left", "right", "vertical", "horizontal", "inside", "outside" and the like are based on the orientational or positional relationships illustrated in the drawings, which are for the mere purpose of facilitating and simplifying the description of the present application, and these relationships do not indicate or imply that the device or component referred to has a specific orientation and is constructed and operated in a specific orientation, and thus it is not to be understood as limiting the present application. Moreover, terms like "first", "second" and "third" are merely for purposes of illustration and are not to be understood as indicating or implying relative importance.

Finally, it is to be noted that the above-mentioned embodiments are only specific implementations and used to describe the technical solution of the present application, but not to limit the present application, and a protection scope of the present application is not limited thereto. Although the present application has been described in detail with reference to the above-mentioned embodiments, it should be understood by those skilled in the art that any person skilled in the art may, within the scope of the disclosure of the present application, make modifications or easily think of changes on the technical solutions described in the above-mentioned embodiments, or make equivalent substitutions to part of the technical features therein. However, such modifications, changes or substitutions do not depart that nature of the corresponding technical solutions from the spirit and scope of the technical solutions of the embodiments of the present application and should be covered within the protection scope of the present application. Therefore, the scope of protection of the present application is subject to the scope of the appended claims.

INDUSTRIAL APPLICABILITY

In the dual-spectrum camera system based on the single sensor and the image processing method provided in the embodiments of the present application, the dual-spectrum camera system based on the single sensor includes the lens, the image sensor, and the logical light separation module and the image fusion module that are sequentially connected to the image sensor. The image sensor includes the RGB photosensitive cells and the IR photosensitive cells, where the infrared cut-off filter layer is disposed on the light incoming path of the RGB photosensitive cells. The image sensor receives the incident light entering through the lens to generate the original image and sends the original image to the logical light separation module. The logical light separation module converts and separates the original image into the visible light image and the infrared image, and sends the visible light image and the infrared image to the image fusion module to generate the fused image. Thus, the optical structure of the dual-spectrum camera system becomes simpler, thereby facilitating the miniaturization of the camera apparatus and reducing the cost.

What is claimed is:

1. A dual-spectrum camera system based on a single sensor, comprising:
    a lens, an image sensor, and a logical light separation module and an image fusion module that are sequentially connected to the image sensor,
    wherein the image sensor comprises red-green-blue (RGB) photosensitive cells and infrared radiation (IR) photosensitive cells, and an infrared cut-off filter layer is arranged on a light incoming path of the RGB photosensitive cells;
    the image sensor is configured to receive incident light entering through the lens to generate an original image and send the original image to the logical light separation module; and
    the logical light separation module is configured to convert and separate the original image into a visible light image and an infrared image, and send the visible light image and the infrared image to the image fusion module to generate a fused image;
    wherein the image fusion module is configured to:
    estimate an ambient illuminance relative value based on the visible light image and output a first weighting coefficient $\omega_1$;
    estimate an ambient haze relative value based on the visible light image and output a second weighting coefficient $\omega_2$;
    perform color gamut conversion on the visible light image to obtain a luminance component and a chrominance component of the visible light image;
    obtain a visible light brightness image based on the luminance component of the visible light image, and perform image stratification on the visible light brightness image and the infrared image to obtain a low frequency layer of the visible light brightness image, a detail layer of the visible light brightness image, and a detail layer of the infrared image;

fuse the visible light luminance component with the infrared image to obtain a luminance component of the fused image based on the first weighting coefficient $\omega_1$, the second weighting coefficient $\omega_2$, the low frequency layer of the visible light brightness image, the detail layer of the visible light brightness image, and the detail layer of the infrared image; and obtain the fused image through the color gamut conversion based on the luminance component of the fused image and the chrominance component of the visible light image.

2. The dual-spectrum camera system as recited in claim 1, wherein the infrared cut-off filter layer is arranged on a surface of a microlens of each of the RGB photosensitive cells of the image sensor.

3. The dual-spectrum camera system as recited in claim 2, wherein a two-dimensional pixel array of the image sensor comprises a plurality of array cells, each of which comprises the RGB photosensitive cells and the IR photosensitive cells;

wherein the logical light separation module is configured to generate a unit visible light image component corresponding to each of the plurality of array cells based on data collected by the RGB photosensitive cells in this array cell, and generate the visible light image based on a plurality of unit visible light image components that are obtained; and the logical light separation module is further configured to generate infrared pixels corresponding to each of the plurality of array cells based on data collected by the IR photosensitive cells in this array cell, and generate the infrared image based on a plurality of infrared pixels that are obtained.

4. The dual-spectrum camera system as recited in claim 2, wherein a two-dimensional pixel array of the image sensor is periodically arranged in 4×4 array cells, wherein each of the 4×4 array cells comprises four types of pixel cells including R, G, B, and IR, where a ratio of numbers of pixels of R:G:B:IR is 2:4:2:8.

5. The dual-spectrum camera system as recited in claim 2, wherein the image sensor is configured to control exposure parameters of the RGB photosensitive cells and the IR photosensitive cells separately according to a two-path auto exposure algorithm.

6. The dual-spectrum camera system as recited in claim 1, wherein the infrared cut-off filter layer is arranged on a surface of a filter of each of the RGB photosensitive cells of the image sensor.

7. The dual-spectrum camera system as recited in claim 6, wherein a two-dimensional pixel array of the image sensor comprises a plurality of array cells, each of which comprises the RGB photosensitive cells and the IR photosensitive cells;

wherein the logical light separation module is configured to generate a unit visible light image component corresponding to each of the plurality of array cells based on data collected by the RGB photosensitive cells in this array cell, and generate the visible light image based on a plurality of unit visible light image components that are obtained; and the logical light separation module is further configured to generate infrared pixels corresponding to each of the plurality of array cells based on data collected by the IR photosensitive cells in this array cell, and generate the infrared image based on a plurality of infrared pixels that are obtained.

8. The dual-spectrum camera system as recited in claim 6, wherein a two-dimensional pixel array of the image sensor is periodically arranged in 4×4 array cells, wherein each of the 4×4 array cells comprises four types of pixel cells including R, G, B, and IR, where a ratio of numbers of pixels of R:G:B:IR is 2:4:2:8.

9. The dual-spectrum camera system as recited in claim 1, wherein a two-dimensional pixel array of the image sensor comprises a plurality of array cells, each of which comprises the RGB photosensitive cells and the IR photosensitive cells;

wherein the logical light separation module is configured to generate a unit visible light image component corresponding to each of the plurality of array cells based on data collected by the RGB photosensitive cells in this array cell, and generate the visible light image based on a plurality of unit visible light image components that are obtained; and the logical light separation module is further configured to generate infrared pixels corresponding to each of the plurality of array cells based on data collected by the IR photosensitive cells in this array cell, and generate the infrared image based on a plurality of infrared pixels that are obtained.

10. The dual-spectrum camera system as recited in claim 9, wherein the logical light separation module is configured to: sum or average color pixel values in each of a plurality of unit array cells of each of the plurality of array cells in the original image to obtain color pixels, and combine the color pixels to obtain the unit visible light image component corresponding to this array cell; sum or average IR pixels values in each of the plurality of unit array cells of each of the plurality of array cells in the original image to obtain IR pixels, and combine the IR pixels to obtain a unit infrared image component corresponding to this array cell; and combine the unit visible light image components to obtain the visible light image, and combine the unit infrared image components to obtain the infrared image.

11. The dual-spectrum camera system as recited in claim 1, wherein a two-dimensional pixel array of the image sensor is periodically arranged in 4×4 array cells, wherein each of the 4×4 array cells comprises four types of pixel cells including R, G, B, and IR, where a ratio of numbers of pixels of R:G:B:IR is 2:4:2:8.

12. The dual-spectrum camera system as recited in claim 1, wherein the image sensor is configured to control exposure parameters of the RGB photosensitive cells and the IR photosensitive cells separately according to a two-path auto exposure algorithm.

13. The dual-spectrum camera system as recited in claim 1, further comprising an image processing module configured to calculate exposure parameters of the visible light image and the infrared image separately according to a two-path auto exposure algorithm, and control the image sensor to update exposure parameters of the RGB photosensitive cells and the IR photosensitive cells separately to obtain a new original image.

14. The dual-spectrum camera system as recited in claim 13, wherein
the logical light separation module is further configured to obtain brightness information of the visible light image and the infrared image separately to generate statistical data of the visible light image and the infrared image, after decomposing the original image into the visible light image and the infrared image; and the image processing module is configured to calculate the exposure parameters of the visible light image and the infrared image separately based on the two-path auto exposure algorithm and the statistical data.

15. An image processing method, applied to a camera that comprises an image sensor, a logical light separation module, and an image fusion module, wherein the image sensor comprises red-green-blue (RGB) photosensitive cells and infrared radiation (IR) photosensitive cells, the image processing method comprising:

receiving, by the image sensor, incident light and generating an original image;

sending the original image to the logical light separation module, and converting and separating, by the logical light separation module, the original image into a visible light image and an infrared image; and sending the visible light image and the infrared image to the image fusion module, and generating a fused image by the image fusion module;

wherein the operation of generating the fused image by the image fusion module comprises:

estimating an ambient illuminance relative value based on the visible light image and outputting a first weighting coefficient $\omega_1$;

estimating an ambient haze relative value based on the visible light image and outputting a second weighting coefficient $\omega_2$;

performing color gamut conversion on the visible light image to obtain a luminance component and a chrominance component of the visible light image;

obtaining a visible light brightness image based on the luminance component of the visible light image, and performing image stratification on the visible light brightness image and the infrared image to obtain a low frequency layer of the visible light brightness image, a detail layer of the visible light brightness image, and a detail layer of the infrared image;

fusing the visible light luminance component with the infrared image to obtain a luminance component of the fused image based on the first weighting coefficient $\omega_1$, the second weighting coefficient $\omega_2$, the low frequency layer of the visible light brightness image, the detail layer of the visible light brightness image, and the detail layer of the infrared image; and obtaining the fused image through the color gamut conversion based on the luminance component of the fused image and the chrominance component of the visible light image.

16. The image processing method as recited in claim 15, wherein the camera further comprises an image processing module configured to run a two-path auto exposure algorithm, and a dual exposure circuit is arranged in the image sensor and configured to control exposure parameters of the RGB photosensitive cells and the IR photosensitive cells separately, wherein the operation of receiving by the image sensor the incident light and generating the original image comprises:

receiving, by the logical light separation module, an original image of a previous frame sent by the image sensor, and decomposing the original image into the visible light image and the infrared image;

calculating exposure parameters of the visible light image and the infrared image separately according to the two-path auto exposure algorithm; and controlling, by the image sensor, the RGB photosensitive cells and the IR photosensitive cells according to the exposure parameters to generate an original image of a current frame.

17. The image processing method as recited in claim 16, wherein the operation of calculating the exposure parameters of the visible light image and the infrared image separately according to the two-path auto exposure algorithm comprises:

obtaining brightness information of the visible light image and the infrared image separately to generate statistical data of the visible light image and the infrared image, and calculating the exposure parameters of the visible light image and the infrared image separately based on the statistical data and the two-path auto exposure algorithm.

18. The image processing method as recited in claim 15, wherein the operation of converting and separating by the logical light separation module the original image into the visible light image and the infrared image comprises:

summing or averaging color pixel values in each of a plurality of unit array cells of each of the plurality of array cells in the original image to obtain color pixels, and combining the color pixels to obtain a unit visible light image component corresponding to this array cell;

summing or averaging IR pixel values in each of the plurality of unit array cells of each of the plurality of array cells in the original image to obtain IR pixels, and combining the IR pixels to obtain a unit infrared image component corresponding to this array cell; and combining the unit visible light image components to obtain the visible light image, and combining the unit infrared image components to obtain the infrared image.

19. The image processing method as recited in claim 15, wherein the operation of performing the color gamut conversion on the visible light image to obtain the luminance component and chrominance component of the visible light image comprises:

converting the visible light image from a Bayer domain into an RGB domain; and converting the visible light image from the RGB domain into a color space in which luminance and chrominance are separated to obtain the luminance component and the chrominance component of the visible light image.

* * * * *